United States Patent
Nagakari

(10) Patent No.: US 12,429,942 B1
(45) Date of Patent: Sep. 30, 2025

(54) REDUCING POWER CONSUMPTION OF A USER INTERFACE

(71) Applicant: TOYOTA JIDOSHA KABUSHIKI KAISHA, Aichi-ken (JP)

(72) Inventor: Takahiro Nagakari, Koganei (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/658,912

(22) Filed: May 8, 2024

(51) Int. Cl.
*G06F 3/01* (2006.01)
*B60K 35/29* (2024.01)

(52) U.S. Cl.
CPC .............. *G06F 3/011* (2013.01); *B60K 35/29* (2024.01); *B60K 2360/741* (2024.01)

(58) Field of Classification Search
CPC .... G06F 3/011; B60K 35/29; B60K 2360/741
See application file for complete search history.

(56) References Cited

U.S. PATENT DOCUMENTS

| | | | |
|---|---|---|---|
| 2016/0196098 A1* | 7/2016 | Roth | G06F 3/012 |
| | | | 715/761 |
| 2017/0364148 A1* | 12/2017 | Kim | G06F 3/1462 |
| 2019/0381271 A1 | 12/2019 | Jo | |
| 2021/0070176 A1* | 3/2021 | Rao | G06F 3/013 |
| 2022/0270570 A1 | 8/2022 | Welsch et al. | |
| 2023/0043033 A1* | 2/2023 | Ronnau | G06F 1/3212 |

* cited by examiner

*Primary Examiner* — Peter D McLoone
(74) *Attorney, Agent, or Firm* — HAUPTMAN HAM, LLP

(57) ABSTRACT

Power consumption of a user interface in a vehicle is reduced. At least one occupant in a vehicle consuming content is determined. A content identifier (ID) associated with the content and an identifier associated with the at least one occupant consuming content is determined. A state of the at least one occupant associated with no longer consuming the content is determined. A device of the at least one occupant associated with no longer consuming the content is set to a power saving mode based on the state of the at least one occupant being determined to no longer be consuming the content.

20 Claims, 5 Drawing Sheets

REDUCING POWER CONSUMPTION OF A USER INTERFACE

TECHNICAL FIELD

This description relates to reducing power consumption of a user interface.

BACKGROUND

The presentation of audio and/or video content within a vehicle has become common in many traveling experiences. For example, vehicle drivers often listen to audio content (e.g., music and/or audible text) while driving, and riders often watch videos within the vehicle while waiting to reach their destination. Additional content includes web browsing, streaming content, and the like. Using a mobile device or other media-playback device, such as an In-Vehicle Infotainment (IVI) System (also referred to as simply Infotainment System), a person is able to access content.

Content is able to be presented on a display for each occupant in a vehicle. An occupant is able to stop consuming content. For example, an occupant is determined to stop consuming content in response to the occupant falling asleep. However, in response to the content continuing to be played regardless of the intention of the occupant, the power consumption of the vehicle might increase.

SUMMARY

In at least embodiment, a method for reducing power consumption of a user interface includes determining at least one occupant in a vehicle consuming content, determining a content identifier (ID) associated with the content and an identifier associated with the at least one occupant consuming the content, determining a state of the at least one occupant associated with no longer consuming the content, and setting a device of the at least one occupant associated with no longer consuming the content to a power saving mode based on the state of the at least one occupant being determined to no longer be consuming the content.

In at least one embodiment, an apparatus for reducing power consumption of user interface includes a memory storing computer-readable instructions, and a processor connected to the memory, wherein the processor is configured to execute the computer-readable instructions to perform operations to determine at least one occupant in a vehicle consuming content, determine a content identifier (ID) associated with the content and an identifier associated with the at least one occupant consuming the content, determine a state of the at least one occupant associated with no longer consuming the content, and set a device of the at least one occupant associated with no longer consuming the content to a power saving mode based on the state of the at least one occupant being determined to no longer be consuming the content.

In at least one embodiment, a non-transitory computer-readable media having computer-readable instructions stored thereon, which when executed by a processor causes the processor to perform operations including determining at least one occupant in a vehicle consuming content, determining a content identifier (ID) associated with the content and an identifier associated with the at least one occupant consuming the content, determining a state of the at least one occupant associated with no longer consuming the content, and setting a device of the at least one occupant associated with no longer consuming the content to a power saving mode based on the state of the at least one occupant being determined to no longer be consuming the content.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
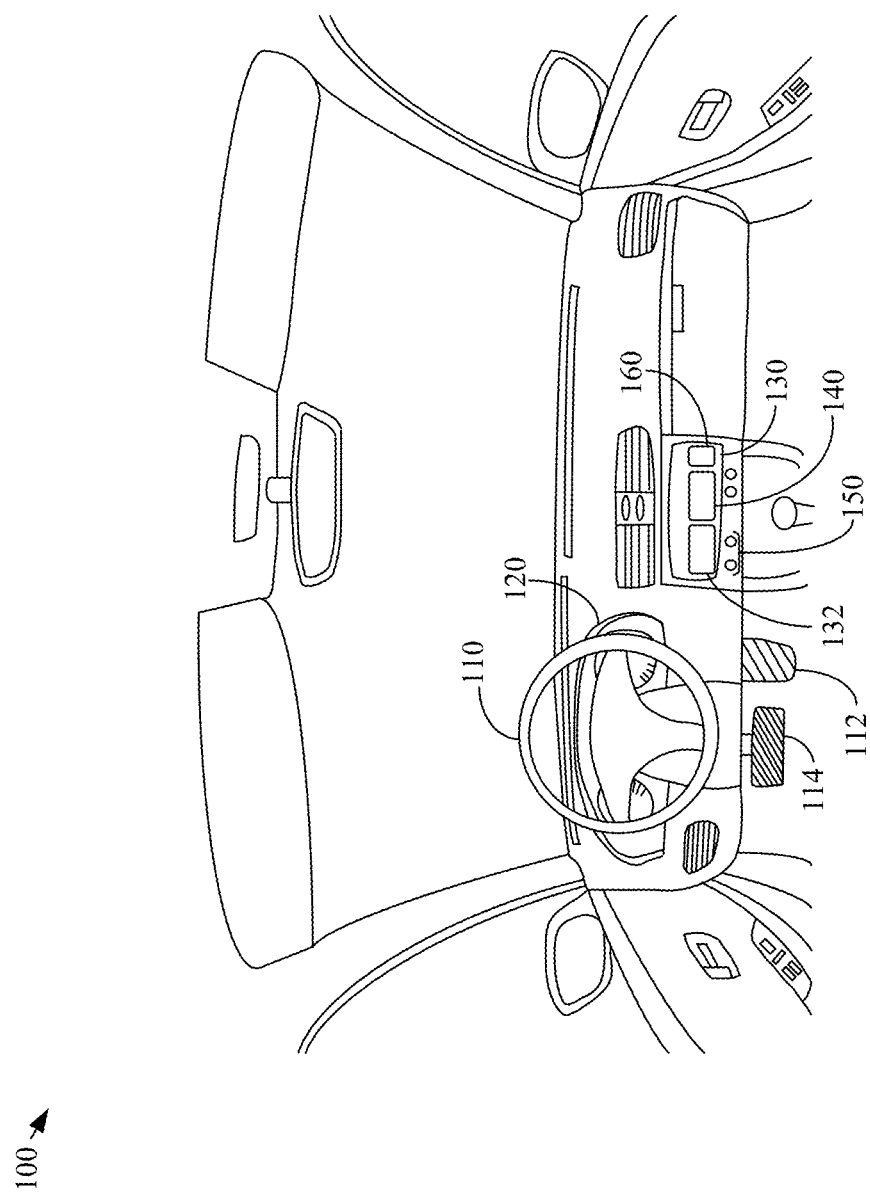
FIG. 1 illustrates a vehicle cockpit according to at least one embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

The foregoing disclosure provides illustration and description but is not intended to be exhaustive or to limit the implementations to the precise form disclosed. Modifications and variations are possible in light of the above disclosure or may be acquired from practice of the implementations.

In at least one embodiment, a method for reducing power consumption of a user interface includes determining at least one occupant in a vehicle consuming content, determining a content identifier (ID) associated with the content and an identifier associated with the at least one occupant consuming the content, determining a state of the at least one occupant associated with no longer consuming the content, and setting a device of the at least one occupant associated with no longer consuming the content to a power saving mode based on the state of the at least one occupant being determined to no longer be consuming the content.

Embodiments described herein provide a method that provides one or more advantages. For example, a Cockpit Domain Controller is able to determine that an occupant of a vehicle is not consuming content on a device, and to reduce power consumption of the device associated with the occupant of the vehicle that is determined to not be consuming content is reduced.

FIG. 1 illustrates a vehicle cockpit 100 according to at least one embodiment.

In FIG. 1, the vehicle cockpit includes Steering Wheel 110, Accelerator Pedal 112, Brake Pedal 114, Instrument Panel 120, Infotainment System 130, and Climate Control System 140. Climate Control System 140 is also sometimes referred to as the Heating, Ventilation, and Air Conditioning (HVAC) System. The Steering Wheel is the part of the steering system that is manipulated by the driver to control the steering system and the direction of the vehicle. By manipulating the Steering Wheel 110, the driver directs the direction of the vehicle through a linkage system to the front wheels. The Accelerator Pedal 112 is used to control fuel and air supply to the engine by application of pressure. Accelerator Pedal 112 is also known as the throttle or gas pedal. The Brake Pedal 114 is pressed to apply the brakes, which cause the vehicle to slow down and/or stop.

Instrument Panel 120 is the portion of the dashboard which is positioned behind the Steering Wheel 110. The Instrument Panel 120 includes various gauges and lights that update the driver on the status of the vehicle. For example, Instrument Panel 120 often includes traction control indicators, engine temperature, tachometer, a fuel gauge, a speedometer, an odometer, turn indicators, gear display, various warning lights, and the like. The tachometer displays the rotation of the engine's crankshaft in revolutions per minute (RPM). The speedometer shows the speed of the vehicle. The odometer shows you the total number of miles traveled since you started driving the car. The fuel gauge shows you how much fuel is left in the vehicle. The temperature gauge indicates the current engine temperature. Alternatively, a designated light is able to be included to warn about engine temperature issues, such as engine overheating. Turn indicators represent flashing lights on either side of the vehicle to communicate to other drivers the direction that the driver intends to turn. A gear display or gear position indicators shows the gear that is currently engaged, e.g., park, neutral, drive, and the like. Warning lights communicate different status items of the vehicle. Vehicles have various features like ESC and ABS pre-installed, not to mention the more standard components or elements. Warning lights are illuminated briefly upon startup as the vehicle checks to ensure the systems are safe and ready for operation. Occasionally one warning light might stay on, indicating a problem, e.g., the engine, headlights, temperature, and the like.

The vehicle includes an Infotainment System 130. In at least one embodiment, the Infotainment System 130 is an In-Vehicle Infotainment (IVI) System (also referred to as simply Infotainment System). However, embodiments described herein are not meant to be limited to IVI Systems. Infotainment System 130 includes one or more Displays 132 for presenting content to occupants of the vehicle. For example, the one or more Displays 132 are able to be positioned for presenting content to each seat in the vehicle.

A Cockpit Domain Controller 140 provides a collection of hardware and software in vehicles that provides content to an occupant of the vehicle, such as audio, video, and other content or information. Cockpit Domain Controller 140 controls the presentation of content and stores conditions for each occupant. A vehicle is also able to include Camera Systems 150. Camera Systems 150 are configured to provide face recognition of occupants, such as the driver and occupants of other passenger seats. Cockpit Domain Controller 140 is able to detect the state of an occupant, such as the occupant falling asleep and no longer consuming content using Camera System 150. Cameras 150 are able to monitor the eyes for signs of tiredness (blinking); the face and head movements for signs of distraction; and the course steered by the car in its road lane (deviations or steering movements by the driver). Other Devices are also able to monitor an occupant of a vehicle for drowsiness (e.g., wearable devices, sensor-equipped seats, smartphone sensors, and the like). Such devices are able to detect changes in pulse and respiration that occur typically before a person falls asleep.

A Data Communication Interface 160 communicates with devices outside the vehicle for providing content to users in the vehicle. Such devices include smartphones, tablets, televisions, laptop computers, servers, and the like. Data Communication Interface 160 supports communication using a wireless connection in accordance with any IEEE 802.11 Wi-Fi protocols, Bluetooth protocols, Bluetooth Low Energy (BLE), or other short range protocols that operate in accordance with a wireless technology standard for exchanging data using any licensed or unlicensed band such as the citizens broadband radio service (CBRS) band, mobile cellular systems using 2.4 GHz bands, 5 GHz bands, 6 GHz bands, and the like. Additionally, a wireless connection is able to operate in accordance with, but is not limited to, RF4CE protocol, ZigBee protocol, Z-Wave protocol, or IEEE 802.15.4 protocol. Those skilled in the art understand that Data Communication Interface 160 is not meant to be limited to a particular communication system or protocol.

Figure 2:
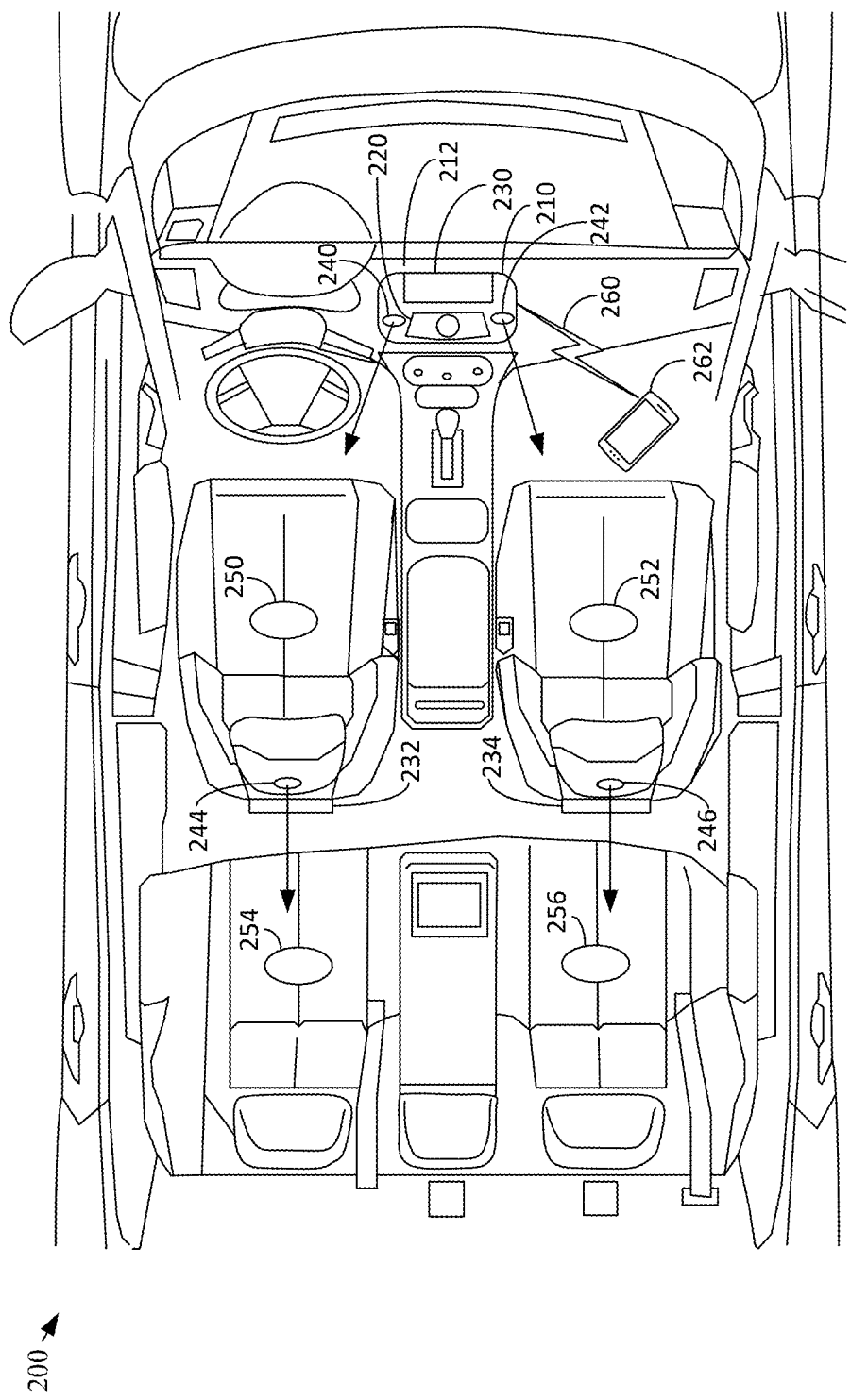
FIG. 2 is a interior diagram of a vehicle according to at least one embodiment.

FIG. 2 is a interior diagram of a vehicle 200 according to at least one embodiment.

In FIG. 2, an Infotainment System 210 is shown centrally located in the dashboard 212 of the vehicle. The Infotainment System 210 is able to be an In-Vehicle Infotainment (IVI) System (also referred to as simply Infotainment System). Infotainment System 210 includes a Cockpit Domain Controller 220 that sets a power saving mode, outputs content, stores the last condition associated with content consumed by occupants, and manages power to a display to turn off the display or to set to a power saving mode in response to detecting the occupant has fallen asleep.

Infotainment System 210 also includes a central Display 230 for presenting content and information regarding the presentation of content. Additional Displays 232, 234 are able to be provided separately for each backseat passenger. Those skilled in the art understand that other arrangements and number of Displays 230, 232, 234 are able to be provided.

In the embodiment shown in FIG. 2, four Cameras 240, 242, 244, 246 are provided to implement a camera system. A first camera 240 is directed at the driver. A second camera 242 is directed toward the front seat passenger. A third camera 244 and a fourth camera 246 are directed toward each of two backseat passengers. However, those skilled in the art understand that the number of cameras implemented by the camera system may be greater or less than four. For example, a front camera 240 is able to be implemented to monitor the front seat driver and passenger. Other arrangements are contemplated by embodiments described herein.

Other Devices are also able to monitor an occupant of a vehicle for drowsiness (e.g., wearable devices, sensor-equipped seats, smartphone sensors, and the like). Such devices are able to detect changes in pulse and respiration that occur typically before a person falls asleep. In FIG. 2, Sensor 250, 252, 254, 256 are provided to seats for detecting changes in pulse and respiration of an occupant that occur typically before a person falls asleep. A Connection 260 is shown from Cockpit Domain Controller 220 to Smartphone 262, wherein Smartphone 262 includes an application that monitors changes in pulse and respiration of an occupant to detect whether an occupant falls asleep. Those skilled in the art understand that other types of sensors are capable of being used to determine the presence or absence of an occupant, such as an occupant exiting the vehicle. The Cockpit Domain Controller 220 determines whether an occupant is drowsy or is sleeping based on input from at least one of Cameras 240, 242, 244, 246, Seat Sensors 250, 252, 254, 256, or Devices 262.

Upon detecting an occupant is dozing, the Cockpit Domain Controller 220 determines a last condition of the content being presented to the occupant. A last condition of content being consumed by an occupant, e.g., a video, music, and the like, is associated with the time the Cockpit Domain Controller 220 determines that an occupant is dozing. In response, the Cockpit Domain Controller 220 is able to set at least one Displays 230, 232, 234 associated with the occupant determined to be dozing to a power saving mode, e.g., powered-off or set to a sleep mode. The Cockpit Domain Controller 220 determines a last condition of the content associated with a time the one or more Displays 230, 232, 234 are set to the power saving mode. Thus, power consumption is reduced.

In response to the one or more Displays 230, 232, 234 recovering from the power saving mode by the operation of the occupant, content is able to be played from a last condition. Also, the information on the last condition is able to be sent to one or more Displays 230, 232, 234 of the occupant so that the user is able to manually resume playing the content from the last condition.

A last condition of the content displayed on the one or more Displays 230, 232, 234 is stored in data storage or other storage available to the occupant in response to detecting that the occupant is no longer consuming content, e.g., dozing of the occupant, the occupant turning off the display, and the like. The last condition is able to be indicated by a position indicator, e.g., a timestamp, a scroll position, a state function, and the like, along with a content identifier (content ID) of the content itself. The content ID is able to be a name of a video, a link to the content, a web address, a name of a game, a product code. The last condition, Identification Information identifying the occupant, and the Content ID is stored, for example in data storage, when dozing is detected by the Cockpit Domain Controller 220. The last condition is able to be recovered by the Cockpit Domain Controller 220 in response to the user no longer dozing or via direct input from the user requesting the last condition of the content be recovered.

Figure 3:
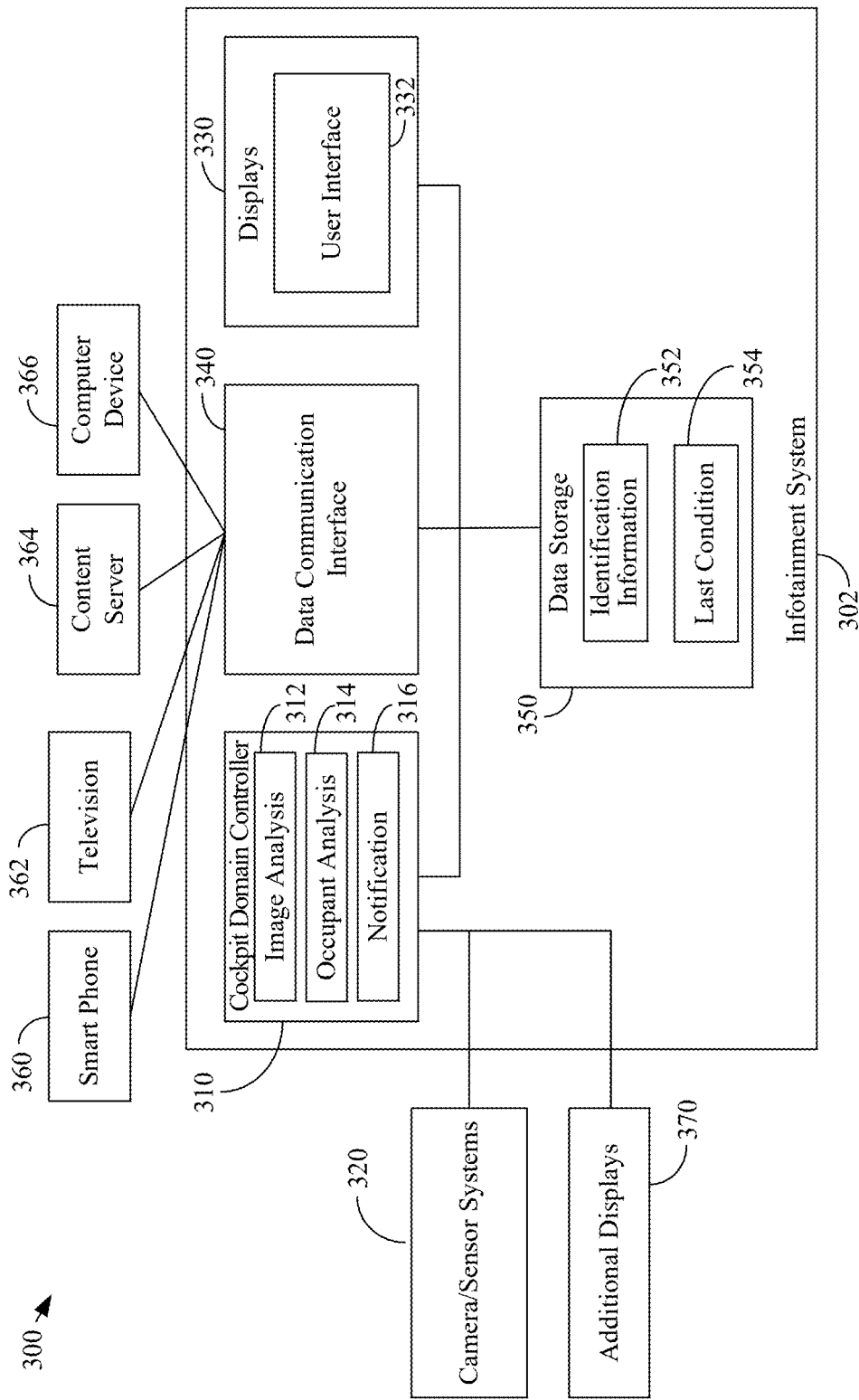
FIG. 3 is a system architecture according to at least one embodiment.

FIG. 3 is a system architecture 300 according to at least one embodiment.

In FIG. 3, Infotainment System 302 includes a Cockpit Domain Controller 310, a Camera System/Other Sensors 320, one or more Displays 330, and a Data Communication Interface 340. The Cockpit Domain Controller 310 determines whether at least one occupant in a vehicle is consuming content. The Cockpit Domain Controller 310 provides content output, stores a Last Condition 354 of content being consumed for each occupant in the vehicle, and manages data for recovering to the Last Condition 354. One or more Displays 330 are used to present content and to present identification of each occupant using a User Interface 332. Additional Displays 370 are able to be provided, for example, for each backseat passenger. Content includes content that is able to be displayed on a screen, such as YouTube, web browsing activity, video games, movies, music data, and the like.

The Camera System 320 is able to support face recognition of occupants in each seat of the vehicle by providing a Cockpit Domain Controller 310 with images of at least one occupant of the vehicle. The Cockpit Domain Controller 310 includes Image Analysis to determine whether an occupant in the image is actually dozing. For example, the Image Analysis 312 is performed using machine learning. Other Sensors 320 are also able to monitor an occupant of a vehicle for drowsiness (e.g., wearable devices, sensor-equipped seats, smartphone sensors, and the like). Such Other Sensors 320 are able to detect changes in pulse and respiration that occur typically before a person falls asleep. For example, the Occupant Analysis 314 is performed by Cockpit Domain Controller 310 to monitor an occupant of a vehicle for drowsiness. Such Occupant Analysis 314 is able to be performed using machine learning.

The Data Communication Interface 340 communicates with user devices. The Data Communication Interface 340 is able to use a wireless network to enable the Cockpit Domain Controller 310 to communicate with the user devices. For example, the Data Communication Interface 340 is able to communicate with devices of an occupant, e.g., a Smartphone 360, a Television 362, a Content Server 364, a Computer Device 366 (e.g., a personal computer, a tablet, a laptop, and the like). Data Communication Interface 340 is able to use a wireless network. The Cockpit Domain Controller 310 is also able to communicate with user devices using a wireless network. Examples of wireless networks include Wi-Fi, an Internet Hot Spot, Bluetooth, Zigbee, Z-Wave, Infrared (IR) wireless, Ultra-Wideband (UWB), Wireless Gigabit (or WiGig), and the like. Data Communication Interface 340 supports communication using a wireless connection in accordance with any IEEE 802.11 Wi-Fi protocols, Bluetooth protocols, Bluetooth Low Energy (BLE), or other short range protocols that operate in accordance with a wireless technology standard for exchanging data using any licensed or unlicensed band such as the citizens broadband radio service (CBRS) band, mobile cellular systems using 2.4 GHz bands, 5 GHz bands, 6 GHz bands, and the like. Additionally, Data Communication Interface 340 supports wireless connections in accordance with, but not limited to, RF4CE protocol, ZigBee protocol, Z-Wave protocol, or IEEE 802.15.4 protocol. Those skilled in the art understand that Data Communication Interface 340 is not meant to be limited to a particular communication system or protocol.

The Cockpit Domain Controller 310 is able to store information in Data Storage 350, including Identification Information 352 associated with an occupant of the vehicle, a content identifier (ID), and the Last Condition 354 as indicated, for example, by a position indicator. According to at least one embodiment, information is able to be stored locally in Data Storage 350, or in the cloud, in a separate storage system, or any other storage configuration.

The Cockpit Domain Controller 310 identifies a state or level of attention of a user as no longer being attentive to the content or is no longer consuming content, e.g., the user is detected to be dozing in the vehicle. Examples of detecting dozing include using image recognition with cameras, and acquiring information from at least one wearable device of the occupant, such as smart watches, fitness trackers, and the like. However, those skilled in the art understand that the Cockpit Domain Controller 310 is able to obtain information from Other Devices that are also able to monitor an occupant of a vehicle for drowsiness (e.g., wearable devices, sensor-equipped seats, smartphone sensors, and the like). Such devices are able to detect changes in pulse and respiration that occur typically before a person falls asleep.

In response to the Cockpit Domain Controller 310 identifying that the user is no longer consuming content, a device, such as a Content Server, one or more Displays 330, and the like, is set to a power saving mode, e.g., powered-off or set to a sleep mode. The Cockpit Domain Controller 310 is also able to detect a user turning off a display. Rather than immediately setting one or more Displays 330 to a power saving mode, a Notification 316 is able to be provided on one or more Displays 330 associated with the occupant giving the occupant an opportunity to prevent the one or more Displays 330 from turning off.

The one or more Displays 330 are able to be set to the power saving mode in response to receiving no input from the user within a predetermined time. For example, the one or more Displays 330 are not set to the power saving mode in response to input being received within the predetermined time. The content is also able to not be stopped in response to the user not being asleep.

A Last Condition 354 of the content displayed on the one or more Displays 330 is stored in Data Storage 350 or other storage available to the occupant in response to detecting that the occupant is no longer consuming content, e.g., dozing of the occupant, the occupant turning off the display, and the like. The Last Condition 354 is able to be indicated by a position indicator, e.g., a timestamp, a scroll position, a state function, and the like, along with a content identifier (content ID) of the content itself. The content ID is able to be a name of a video, a link to the content, a web address, a name of a game, a product code.

The Last Condition 354, Identification Information 352 identifying the occupant, and the Content ID is stored, for example in Data Storage 350, when dozing is detected by the Cockpit Domain Controller 310. The Last Condition 354, Identification Information 352 identifying the occupant, and the Content ID are able to be recovered by the Cockpit Domain Controller 310 in response to the user no longer dozing or via direct input from the user requesting the Last Condition 354 of the content be recovered.

According to at least one embodiment, in the power saving mode, the one or more Displays 330 are turned off but audio content continues to be provided in response to detecting dozing of the occupant. Other occupants, including the driver, are thus able to continue to enjoy the audio content.

The Cockpit Domain Controller 310 determines whether at least one occupant is ready to resume consuming the content. In response to the one or more Displays 330 recovering from the power saving mode by the operation of the occupant, the content is able to be played from the Last Condition 354. Also, the information on the Last Condition 354 is able to be sent to one or more Displays 330 of the occupant so that the user is able to manually resume playing the content from the Last Condition 354. Thus, content is able to continue or is able to be discontinued based on a selected preference of the user.

The Cockpit Domain Controller 310 is able to present on the one or more Displays 330 a message asking permission to set the one or more Displays 330 to the power saving mode when the Cockpit Domain Controller 310 detects that an occupant is dozing or has fallen asleep. The one or more Displays 330 are set to the power saving mode in response to no operation by the occupant being provided within a predetermined time, while the one or more Displays 330 are not set to the power saving mode in response to operation by the occupant being provided input within the predetermined time. Thus, the Cockpit Domain Controller 310 is able to prevent the content from being stopped when the occupant is not asleep.

Figure 4:
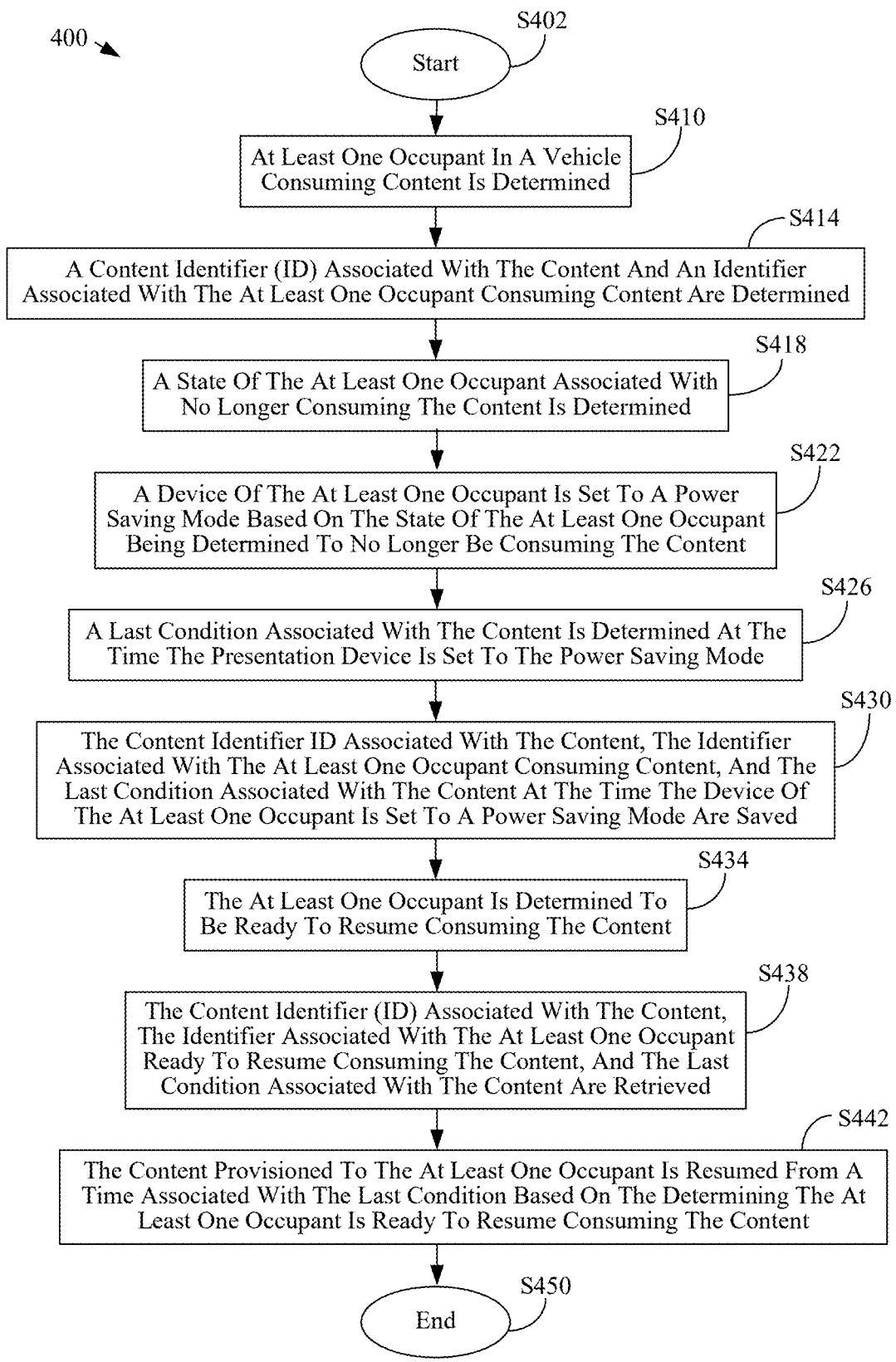
FIG. 4 is a is a flowchart of a method for reducing power consumption of a user interface according to at least one embodiment.

FIG. 4 is a flowchart 400 of a method for reducing power consumption of a user interface according to at least one embodiment.

In FIG. 4, the process starts S402 and at least one occupant in a vehicle consuming content is determined S410. Referring to FIG. 3, Infotainment System 302 includes a Cockpit Domain Controller 310, a Camera System/Other Sensors 320, one or more Displays 330, and a Data Communication Interface 340. The Cockpit Domain Controller 310 determines whether at least one occupant in a vehicle is consuming content. The Cockpit Domain Controller 310 provides content output, stores a Last Condition 354 of content being consumed for each occupant in the vehicle, and manages data for recovering to the Last Condition 354.

A content identifier (ID) associated with the content and an identifier associated with the at least one occupant consuming content are determined S414. Referring to FIG. 3, the Cockpit Domain Controller 310 is able to store information in Data Storage 350, including Identification Information 352 associated with an occupant of the vehicle, a content identifier (ID), and the Last Condition 354 as indicated, for example, by a position indicator.

A state of the at least one occupant associated with no longer consuming the content is determined S418. Referring to FIG. 3, the Cockpit Domain Controller 310 identifies a state or level of attention of a user as no longer being attentive to the content or is no long consuming content, e.g., the user is detected to be dozing in the vehicle. Examples of detecting dozing include using image recognition with cameras, and acquiring information from at least one wearable device of the occupant, such as smart watches, fitness trackers, and the like. However, those skilled in the art understand that the Cockpit Domain Controller 310 is able to obtain information from Other Devices that are also able to monitor an occupant of a vehicle for drowsiness (e.g., wearable devices, sensor-equipped seats, smartphone sensors, and the like). Such devices are able to detect changes in pulse and respiration that occur typically before a person falls asleep.

A device of the at least one occupant is set to a power saving mode based on the state of the at least one occupant being determined to no longer be consuming the content S422. Referring to FIG. 3, in response to the Cockpit Domain Controller 310 identifying that the user is no longer consuming content, a device, such as a Content Server, one or more Displays 330, and the like, is set to a power saving mode, e.g., powered-off or set to a sleep mode. A Last Condition 354 of the content displayed on the one or more Displays 330 is stored in Data Storage 350 or other storage available to the occupant in response to detecting the occupant is no longer consuming content, e.g., dozing of the occupant, the occupant turning off the display, and the like. The Last Condition 354 is able to be indicated by a position indicator, e.g., a timestamp, a scroll position, a state function, and the like, along with a content identifier (content ID) of the content itself. The content ID is able to be a name of a video, a link to the content, a web address, a name of a game, a product code. The Cockpit Domain Controller 310 is also able to detect a user turning off a display. Rather than immediately setting one or more Displays 330 to a power saving mode, a Notification 316 is able to be provided on one or more Displays 330 associated with the occupant giving the occupant an opportunity to prevent the one or more Displays 330 from turning off. The one or more Displays 330 are able to be set to the power saving mode in response to receiving no input from the user within a predetermined time. For example, the one or more Displays 330 are not set to the power saving mode in response to input being received within the predetermined time. The content is also able to not be stopped in response to the user not being asleep.

A last condition associated with the content is determined at the time the device is set to the power saving mode S426. Referring to FIG. 3, a Last Condition 354 of the content displayed on the one or more Displays 330 is stored in Data Storage 350 or other storage available to the occupant in response to detecting that the occupant is no longer consuming content, e.g., dozing of the occupant, the occupant turning off the display, and the like. The Last Condition 354 is able to be indicated by a position indicator, e.g., a timestamp, a scroll position, a state function, and the like, along with a content identifier (content ID) of the content itself. The content ID is able to be a name of a video, a link to the content, a web address, a name of a game, a product code.

The content identifier ID associated with the content, the identifier associated with the at least one occupant consuming content, and the last condition associated with the content at the time the device of the at least one occupant is set to a power saving mode are saved S430. Referring to FIG. 3, the Last Condition 354, Identification Information 352 identifying the occupant, and the Content ID is stored, for example in Data Storage 350, when dozing is detected by the Cockpit Domain Controller 310. The Last Condition 354 is able to be recovered by the Cockpit Domain Controller 310 in response to the user no longer dozing or via direct input from the user requesting the Last Condition 354 of the content be recovered.

The at least one occupant is determined to be ready to resume consuming the content S434. Referring to FIG. 3, The Cockpit Domain Controller 310 determines whether at least one occupant is ready to resume consuming the content.

The content identifier (ID) associated with the content, the identifier associated with the at least one occupant ready to resume consuming the content, and the last condition associated with the content are retrieved S438. Referring to FIG. 3, the Last Condition 354, Identification Information 352 identifying the occupant, and the Content ID are able to be recovered by the Cockpit Domain Controller 310 in response to the user no longer dozing or via direct input from the user requesting the Last Condition 354 of the content be recovered.

The content provisioned to the at least one occupant is resumed from a time associated with the last condition based on the determination that at least one occupant is ready to resume consuming the content S442. Referring to FIG. 3, the Cockpit Domain Controller 310 determines whether at least one occupant is ready to resume consuming the content. In response to the one or more Displays 330 recovering from the power saving mode by the operation of the occupant, the content is able to be played from the Last Condition 354. The Last Condition 354 is able to be indicated by a position indicator, e.g., a timestamp, a scroll position, a state function, and the like, along with a content identifier (content ID) of the content itself. The content ID is able to be a name of a video, a link to the content, a web address, a name of a game, a product code.

The process then terminates S440.

At least one embodiment of the method for reducing power consumption of a user interface includes determining at least one occupant in a vehicle consuming content, determining a content identifier (ID) associated with the content and an identifier associated with the at least one occupant consuming the content, determining a state of the at least one occupant associated with no longer consuming the content, and setting a device of the at least one occupant associated with no longer consuming the content to a power saving mode based on the state of the at least one occupant being determined to no longer be consuming the content.

Figure 5:
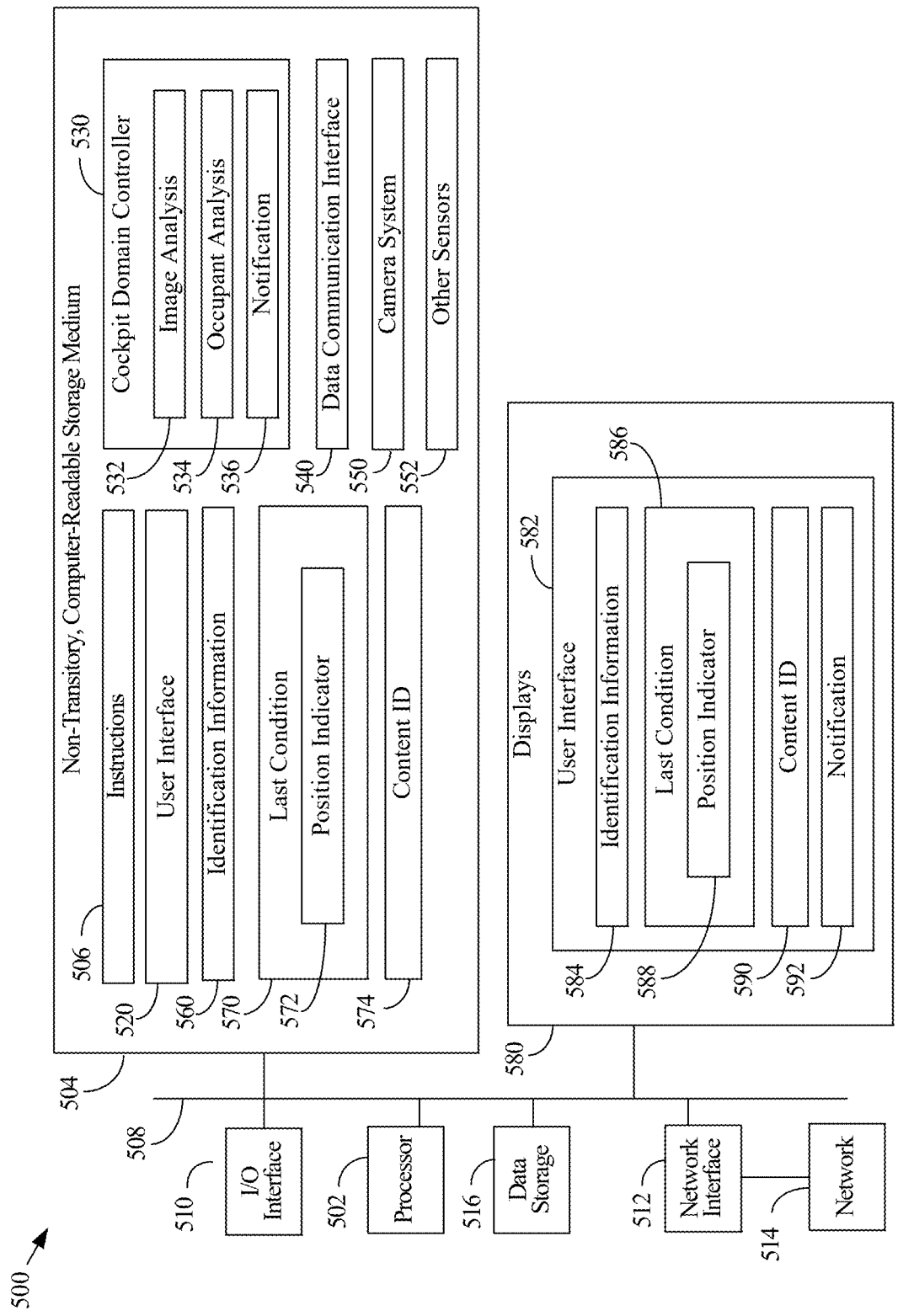
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 manages content displayed in a vehicle. Processing circuitry 500 implements a method for reducing power consumption of a user interface using Processor 502. Processing circuitry 500 also includes a Non-Transitory, Computer-Readable Storage Medium 504 that is used to implement the method for reducing power consumption of a user interface. Non-Transitory, Computer-Readable Storage Medium 504, amongst other things, is encoded with, i.e., stores, Instructions 506, i.e., computer program code, that are executed by Processor 502 causes Processor 502 to perform operations for reducing power consumption of a user interface. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514.

Processor 502 is configured to execute Instructions 506 encoded in Non-Transitory, Computer-Readable Storage Medium 504 to cause processing circuitry 500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information is stored in Non-Transitory, Computer-Readable Storage Medium 504 as UI 520.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 includes one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for reducing power consumption of a user interface. In one or more embodiments, Non-Transitory, Computer-Readable Storage Medium 504 also stores information, such as algorithm which facilitates performing at least a portion of the processes and/or methods for reducing power consumption of a user interface.

Accordingly, in at least one embodiment, Processor 502 executes Instructions 506 stored on the one or more Non-Transitory, Computer-Readable Storage Medium 504 to implement a method for reducing power consumption of a user interface. Processor 502 implements an Infotainment System that includes a Cockpit Domain Controller 530 that sets a power saving mode, outputs content, stores the last condition associated with content consumed by occupants, and manages power to a display to turn off the display or to set to a power saving mode in response to detecting the occupant has fallen asleep. Processor 502 is configured to use Cockpit Domain Controller 530 to set one or more Displays 580 to a power saving mode based on input from Camera System 550, Other Sensors 552, and the like.

Processor 502 implements a Data Communication Interface 540 that is coupled to the Cockpit Domain Controller 530 to communicate with devices inside or outside the vehicle. For example, the Data Communication Interface 540 is able to use a wireless network. Processor uses Cockpit Domain Controller 530 to acquire Identification Information 560 to identify at least one occupant who is watching some content. Content is associated with an occupant through the Identification Information 560. The Identification Information 560 includes information identifying an occupant such as a facial image, device ID, and the like.

Camera System 550, including one or more cameras, is able to be coupled to the Cockpit Domain Controller 530 to monitor an occupant of a vehicle for drowsiness.

Processor 502 uses Image Analysis 532 of Cockpit Domain Controller 530 to perform facial recognition to identify occupants in each area of the vehicle based on images from Camera System 550 and to detect whether an occupant is drowsy, is about to fall asleep, or has fallen asleep. Image Analysis 532, e.g., machine learning, is able to be used to analyze images of occupants to determine Identification Information 560 for each occupant. Processor 502 also uses Other Sensors 552. For Example, Processor 502 uses Occupant Analysis 534 of Cockpit Domain Controller 530 to process data from Other Sensors 552 to be detect whether an occupant is drowsy.

Upon detecting an occupant is drowsy, is about to fall asleep, or has fallen asleep, Processor 502 determines a Last Condition 570 of the content associated with the Identification Information 560. Last Condition 570 includes a Position Indicator 572 of content being consumed by an occupant, e.g., a video, music, and the like, wherein the Position Indicator 572 is associated with the time the occupant is determined to be drowsy and no longer consuming content. The Last Condition 570 is indicated by the Position Indicator 572, e.g., a timestamp, a scroll position, a state function, and the like, along with a Content Identifier (Content ID 574) of the content itself. Using the content ID 574, Processor 502 determines a name of a video, a link to the content, a web address, a name of a game, a product code, and the like.

Processor 502 causes Cockpit Domain Controller 530 to store information, including the Content ID 574, Last Condition 570 as indicated, for example, by Position Indicator 572. However, according to at least one embodiment, information is able to be stored in Data Storage 516, or in the cloud, in a separate storage system, or any other storage configuration.

At a later time, Processor 502 determines whether the occupant is ready to resume consuming the content using Cockpit Domain Controller 530. The Cockpit Domain Controller 530 identifies that the occupant is ready to resume consuming the content according to the Identification Information 560, and then obtains the Content ID 574 associated with the re-entering occupant, and the Last Condition 570 for the content. Using the Last Condition 570, Processor 502 is able to cause Cockpit Domain Controller 530 to resume the content from the point the one or more Displays 580 were set to a power saving mode.

The Last Condition 570 includes Position Indicator 572, which is able to be a timestamp associated with the content when the occupant exited the vehicle, an approximate last position, a calculated estimate of the Last Condition 570, and the like. For example, in response to Position Indicator 572 indicating the Last Condition 570 being a position at 10 minutes, Processor 502 is able to cause Cockpit Domain Controller 530 to resume playback, for example, at 9 minutes and 50 seconds. Information about the Last Condition 570 of the content is able to be sent to the occupant, e.g., the information is sent to a user device such as a smartphone, a personal computer or laptop, a TV, and the like via Data Communication Interface 540.

Processor 502 is able to use one or more Displays 580 to present content and to present identification of each occupant using a User Interface 582, including Identification Information 584. Information about the Last Condition 570 of the content is able to be presented on one or more Displays 580. The information about the Last Condition 570 is able to be sent to the occupant via a Notification 536 sent to the occupant via at least one of a text message, an email, a push notification to an application, a voice mail message, and the like. User Interface 582 presents Notification 592 on one or more of Displays 580. The occupant is able to use User Interface 582 to retrieve the Last Condition 586 of the content in the vehicle.

Processor 502 is able to present information about the content and the Last Condition 586 including Position Indicator 588, as an option, on one or more Displays 580 in the vehicle, e.g., an infotainment system. Upon an occupant being determined to be ready to resume consuming the content by the Cockpit Domain Controller 530, the Processor 502 causes the Cockpit Domain Controller 530 to access Data Storage 516 to determine possible existing entries associated with the occupant determined to be ready to resume consuming the content.

In some situations, the Cockpit Domain Controller 530 does not identify any entries associated with the occupant. In this situation, the Cockpit Domain Controller 530 is able to question the occupant for information via User Interface 582, such as a Content ID 590 and position. In another situation, Processor 502 causes the Cockpit Domain Controller 530 to identify more than one entry associated with the occupant. Again, the Cockpit Domain Controller 530 is able to communicate with the occupant through a device of the occupant or via the one or more Displays 580 to determine which entry the occupant wants to use.

Processor 502 is also able to cause Cockpit Domain Controller 530 to use a default setting that uses the latest entry. The Cockpit Domain Controller 530 is also able to delete older entries and save a current entry in response to an occupant exiting the vehicle so that multiple entries are not used. In response to the occupant being determined to be ready to resume consuming the content by the Cockpit Domain Controller 530, Processor 502 reads the entry from Data Storage 516 and then removes the entry. The occupant determined to be ready to resume consuming the content is thus able to resume consuming the content from the last position.

Embodiments described herein provide a method that provides one or more advantages. For example, a Cockpit Domain Controller is able to determine that an occupant of a vehicle is not consuming content on a device, and to reduce power consumption of the device associated with the occupant of the vehicle that is determined to not be consuming content is reduced. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for reducing power consumption of user interface, comprising:
    determining at least one occupant in a vehicle consuming content;
    determining a content identifier (ID) associated with the content and an identifier associated with the at least one occupant consuming the content;
    determining a state of the at least one occupant associated with no longer consuming the content; and
    setting a device of the at least one occupant associated with no longer consuming the content to a power saving mode based on the state of the at least one occupant being determined to no longer be consuming the content and saving a last position in the content being provisioned in response to the occupant no longer consuming content.

2. The method of claim 1, wherein the determining the state of the at least one occupant associated with no longer consuming the content includes at least one of performing image recognition of an image of the at least one occupant, or acquiring information from at least one wearable device of the at least one occupant.

3. The method of claim 1, wherein the setting the device to the power saving mode includes reducing power to the device of the at least one occupant or stopping provisioning of content to the device of the at least one occupant.

4. The method of claim 1, wherein the setting the device of the at least one occupant to the power saving mode includes providing the at least one occupant with a message asking permission to set the device to the power saving mode.

5. The method of claim 1, wherein the setting the device of the at least one occupant to the power saving mode includes:

setting the device of the at least one occupant to the power saving mode in response to receiving no input from the at least one occupant within a predetermined time.

6. The method of claim 1 further comprising:
determining a last condition associated with the content at a time the device is set to the power saving mode;
determining whether the at least one occupant is ready to resume consuming the content;
retrieving the content identifier (ID) associated with the content, the identifier associated with the at least one occupant ready to resume consuming the content, and the last condition associated with the content; and
resuming the provisioning of the content from the last position in the content to the at least one occupant from a time associated with the last condition based on the determination that the at least one occupant is ready to resume consuming the content.

7. The method of claim 6, wherein the resuming the provisioning of the content includes determining at least one of a timestamp, a scroll position, or a state function associated with the last position in the content being provisioned at the time the device of the at least one occupant determined to no longer be consuming the content is set to the power saving mode.

8. An apparatus for reducing power consumption of user interface, comprising:
a memory storing computer-readable instructions; and
a processor connected to the memory, wherein the processor is configured to execute the computer-readable instructions to perform operations to:
determine at least one occupant in a vehicle consuming content;
determine a content identifier (ID) associated with the content and an identifier associated with the at least one occupant consuming the content;
determine a state of the at least one occupant associated with no longer consuming the content; and
set a device of the at least one occupant associated with no longer consuming the content to a power saving mode based on the state of the at least one occupant being determined to no longer be consuming the content and save a last position in the content being provisioned in response to the occupant no longer consuming content.

9. The apparatus of claim 8, wherein the processor is further configured to determine the state of the at least one occupant associated with no longer consuming the content by at least one of performing image recognition of an image of the at least one occupant, or acquiring information from at least one wearable device of the at least one occupant.

10. The apparatus of claim 8, wherein the processor is further configured to set the device to the power saving mode by reducing power to the device of the at least one occupant or stopping provisioning of content to the device of the at least one occupant.

11. The apparatus of claim 8, wherein the processor is further configured to set the device of the at least one occupant to the power saving mode by providing the at least one occupant with a message asking permission to set the device to the power saving mode.

12. The apparatus of claim 8, wherein the processor is further configured to set the device of the at least one occupant to the power saving mode by setting the device of the at least one occupant to the power saving mode in response to receiving no input from the at least one occupant within a predetermined time.

13. The apparatus of claim 8, wherein the processor is further configured to:
determine a last condition associated with the content at a time the device is set to the power saving mode;
determine whether the at least one occupant is ready to resume consuming the content;
retrieve the content identifier (ID) associated with the content, the identifier associated with the at least one occupant ready to resume consuming the content, and the last condition associated with the content; and
resume the provisioning of the content from the last position in the content to the at least one occupant from a time associated with the last condition based on the determination that the at least one occupant is ready to resume consuming the content.

14. The apparatus of claim 13, wherein the processor is further configured to resume the provisioning of the content by determining at least one of a timestamp, a scroll position, or a state function associated with the last position in the content being provisioned at the time the device of the at least one occupant determined to no longer be consuming the content is set to the power saving mode.

15. A non-transitory computer-readable media having computer-readable instructions stored thereon, which when executed by a processor causes the processor to perform operations comprising:
determining at least one occupant in a vehicle consuming content;
determining a content identifier (ID) associated with the content and an identifier associated with the at least one occupant consuming the content;
determining a state of the at least one occupant associated with no longer consuming the content; and
setting a device of the at least one occupant associated with no longer consuming the content to a power saving mode based on the state of the at least one occupant being determined to no longer be consuming the content and saving a last position in the content being provisioned in response to the occupant no longer consuming content.

16. The non-transitory computer-readable media of claim 15, wherein the determining the state of the at least one occupant associated with no longer consuming the content includes at least one of performing image recognition of an image of the at least one occupant, or acquiring information from at least one wearable device of the at least one occupant.

17. The non-transitory computer-readable media of claim 15, wherein the setting the device to the power saving mode includes reducing power to the device of the at least one occupant or stopping provisioning of content to the device of the at least one occupant.

18. The non-transitory computer-readable media of claim 15, wherein the setting the device of the at least one occupant to the power saving mode includes at least one of:
providing the at least one occupant with a message asking permission to set the device to the power saving mode; or
setting the device of the at least one occupant to the power saving mode in response to receiving no input from the at least one occupant within a predetermined time.

19. The non-transitory computer-readable media of claim 15 further comprising:
determining a last condition associated with the content at a time the device is set to the power saving mode;
determining whether the at least one occupant is ready to resume consuming the content;

retrieving the content identifier (ID) associated with the content, the identifier associated with the at least one occupant ready to resume consuming the content, and the last condition associated with the content; and resuming the provisioning of the content from the last position in the content to the at least one occupant from a time associated with the last condition based on the determination that the at least one occupant is ready to resume consuming the content.

20. The non-transitory computer-readable media of claim 19, wherein the resuming the provisioning of the content includes determining at least one of a timestamp, a scroll position, or a state function associated with the last position in the content being provisioned at the time the device of the at least one occupant determined to no longer be consuming the content is set to the power saving mode.

* * * * *